UNITED STATES PATENT OFFICE.

JOSEPH BOND, JR., OF PHILADELPHIA, PENNSYLVANIA, ASSIGNOR OF ONE-HALF HIS RIGHT TO CHARLES F. ODIORNE, OF SAME PLACE.

IMPROVEMENT IN METHODS OF PREVENTING DROSS IN GALVANIZING-VESSELS.

Specification forming part of Letters Patent No. 184,825, dated November 28, 1876; application filed October 17, 1876.

*To all whom it may concern:*

Be it known that I, JOSEPH BOND, Jr., of Philadelphia, Pennsylvania, have invented an Improvement in Preventing Dross in Galvanizing-Vessels, of which the following is a specification:

The object of my invention is to prevent the accumulation of dross in vessels containing molten zinc by nickel-plating or nickel-lining the interior of the vessel.

In coating metal objects with zinc—a process generally termed "galvanizing"—it has been the practice to melt the zinc, and maintain it in a molten condition, in a vessel composed of strong plates of wrought-iron. The intimate contact of the zinc with the iron injuriously affects the latter, and at the same time causes the accumulation of dross at the bottom of the vessel; and this dross, which should not be confounded with that formed at the surface of the metal, must be removed from time to time by the exercise of considerable labor, so that it may not interfere with the galvanizing operations. The creation of the dross also results in the loss of the galvanizing metal, or the dross must undergo an expensive process to be reconverted into available zinc.

Attempts have been made to obviate these difficulties by making the vessel for containing the zinc-bath of earthenware or fire-clay; but the vessels are required to be of such a size, and this material is so friable, that the plan proved to be impracticable.

I have succeeded in overcoming the evils above referred to by plating the interior of the usual wrought-iron vessel with nickel, by well-known nickel-plating processes, practical tests having determined the fact that no dross will accumulate in melting zinc in a nickel-plated vessel, or in a vessel of iron lined with nickel.

I claim as my invention—

The mode described of preventing the accumulation of dross in a bath of zinc—that is to say, by keeping the molten zinc in contact with a surface of nickel, as set forth.

In testimony whereof I have signed my name to this specification in the presence of two subscribing witnesses.

JOSEPH BOND, JR.

Witnesses:
    HENRY HOWSON, Jr.,
    HARRY SMITH.